June 4, 1940.  S. ZIPSER  2,202,939

PORTABLE LIGHT METER

Filed June 9, 1939

Inventor:
Sidney Zipser
By Roberts, Cushman & Woodberry
his Attys.

Patented June 4, 1940

2,202,939

UNITED STATES PATENT OFFICE 2,202,939

PORTABLE LIGHT METER

Sidney Zipser, Los Angeles, Calif., assignor to Technicolor Motion Picture Corporation, Los Angeles (Hollywood), Calif., a corporation of Maine Application June 9, 1939, Serial No. 278,240

2 Claims. (Cl. 88—23)

In the art of photography, particularly in cinematography, it is often desirable to measure both the light incident to an object or scene and also the light reflected from the object or scene. Objects of the present invention are to produce a light meter capable of taking both measurements quickly and easily without requiring the operator to change either his position or that of the indicating face upon which the two measurements are read.

Figure 1:
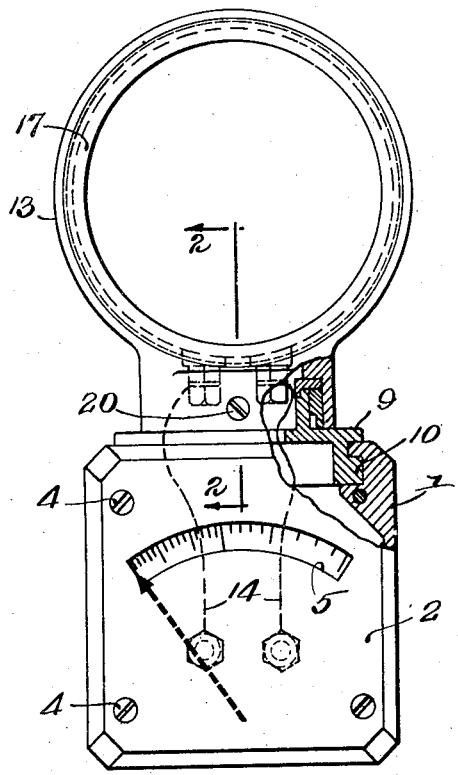
Figure 2:
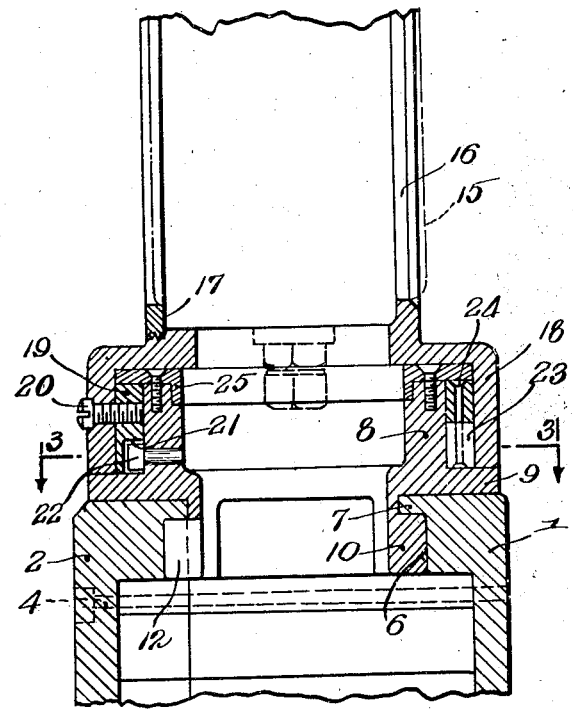
Figure 4:
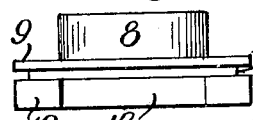
Figure 5:
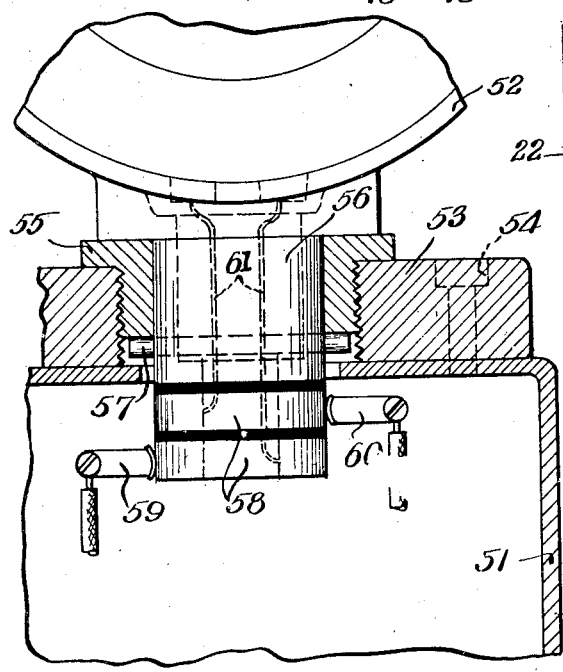
Figure 3:
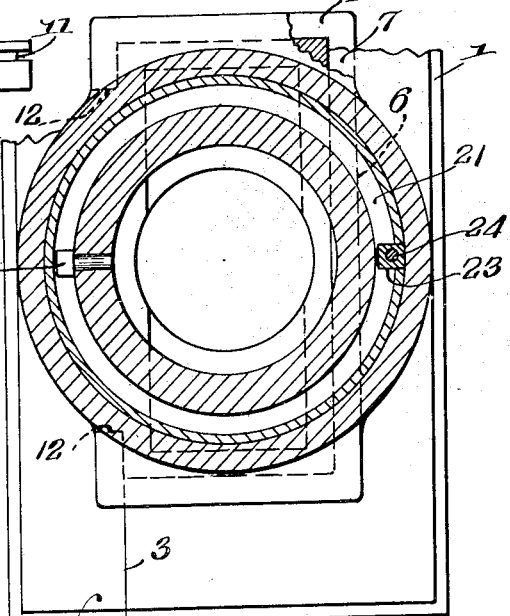

For the purpose of illustration typical embodiments of the invention are shown in the accompanying drawing in which Fig. 1 is a front view of one embodiment;
Fig. 2 is a section on line 2—2 of Fig. 1;
Fig. 3 is a section on line 3—3 of Fig. 2;
Fig. 4 is a side elevation of an adaptor ring; and
Fig. 5 is a front view of a modification showing parts in section.

The particular embodiment of the invention shown in Figs. 1 to 4 comprises a meter casing 1 having an open front covered by a front plate 2, the front plate seating on the casing in the plane 3 (Figs. 2 and 3) and being secured by screws 4. The front 2 has an opening 5 through which the meter scale is visible. As shown in Figs. 1 and 3 the meter casing is rectangular in both vertical and horizontal cross-sections. In the top of the meter casing is a rectangular opening 6 and an overhanging flange 7. Mounted in the opening 6 is an adaptor comprising a cylindrical upper portion 8 and rectangular lower portions 9 and 10 separated by a groove 11 adapted to receive the flange 7. As shown in Figs. 2, 3 and 4 the front portion of the part 10 is cut away as indicated at 12 to give access to the interior of the adaptor when the front plate 2 of the meter is removed.

Rotatably mounted on the cylindrical portion 8 of the adaptor is a casing 13 for a photoelectric cell having leads 14 connected to the meter, the outline of the cell being indicated by the broken lines 15 in Fig. 2. The front of the cell casing has a circular opening 16 through which light is admitted to the cell and at the rear the casing is provided with a threaded ring 17 to retain the cell in the casing. At the bottom the cell casing comprises a circular portion 18 in which a ring 19 is retained by means of screws 20. At its lower inner edge the ring 19 is provided with an annular recess 21 to receive the head 22 of a pin mounted in the upstanding portion 8 of the adaptor. At one side the ring 19 carries a key 23 which is secured to the ring by means of a screw 24. Mounted on top of the adaptor is a ring 25 which overhangs the ring 19 thereby preventing the cell casing from moving away from the meter casing while permitting rotation of the two casings relative to each other.

From the foregoing it will be evident that the meter casing can be rotated through approximately 360°, 180° in each direction from the position shown in Fig. 3 until the key 23 engages the stop pin 22. Thus the cell casing may be turned to cause the cell to face either in the same direction or in the opposite direction to that of the opening 5 in the meter casing.

The modification shown in Fig. 5 comprises a meter casing 51 and a photoelectric cell casing 52 rotatably interconnected by a collar 53 secured to the casing 51 by means of screws 54 and a collar 55 threaded into the collar 53. The meter casing 52 is provided with a cylindrical portion 56 which is rotatable in the collar 55 and which projects into the casing 51. A pin 57 extending through the cylindrical portion 56 restrains the cylindrical portion from pulling out of the collar 55 while permitting free rotation. On the lower end of the cylindrical portion are two slip rings 58 contacting with brushes 59 and 60 mounted in the meter casing, the leads 61 from the photoelectric cell being connected to the slip rings 58. In this modification the rotation of the photoelectric cell is unlimited.

It should be understood that the present disclosure is for the purpose of illustration only and that this invention includes all modifications and equivalents which fall within the scope of the appended claims.

I claim:

1. A light measuring device comprising a meter casing having a front opening through which the meter may be read, a photo-cell casing having a front opening through which light may be admitted to the cell, means for rotatably mounting one casing on the other to revolve about an axis extending approximately medially through each casing so that said openings may face in the same or opposite directions, and means electrically interconnecting the cell with the meter in each angular relationship of the casings, whereby the operator may measure the light incident to and reflected from an object merely by turning the cell casing through 180° without changing either his position or that of the casing.

2. A light measuring device comprising a meter, a meter casing having a front opening through which the meter may be read, a photo-cell at one side of the meter, a cell casing having a front opening through which light may be admitted to the cell, a circular neck on each casing directed toward the other casing, one neck telescoping over the other neck so that the cell casing may be turned about the neck axis to face in the same direction as the meter casing or in the opposite direction, and means electrically interconnecting the cell with the meter in each angular relationship of the casings, whereby the operator may measure the light incident to and reflected from an object merely by turning the cell casing through 180° without changing either his position or that of the meter.

SIDNEY ZIPSER.